US008126446B2

(12) United States Patent
Hassan et al.

(10) Patent No.: US 8,126,446 B2
(45) Date of Patent: Feb. 28, 2012

(54) SYSTEM AND METHOD FOR PROVISIONING A THIRD PARTY MOBILE DEVICE EMULATOR

(75) Inventors: Mahmud-Ul Hassan, Kanata (CA); Nicholas Wilson, Ottawa (CA)

(73) Assignee: Research in Motion Limited, Waterloo (CA)

( * ) Notice: Subject to any disclaimer, the term of this patent is extended or adjusted under 35 U.S.C. 154(b) by 436 days.

(21) Appl. No.: 12/182,702

(22) Filed: Jul. 30, 2008

(65) Prior Publication Data

US 2008/0288237 A1     Nov. 20, 2008

Related U.S. Application Data

(63) Continuation of application No. 11/266,327, filed on Nov. 4, 2005, now Pat. No. 7,613,453.

(51) Int. Cl.
*H04M 3/00*     (2006.01)
(52) U.S. Cl. .......... 455/418; 707/10; 707/203; 455/419; 455/420
(58) Field of Classification Search ................. 455/418; 370/466; 719/310; 707/1, 10, 203
See application file for complete search history.

(56) References Cited

U.S. PATENT DOCUMENTS

| | | | |
|---|---|---|---|
| 6,496,979 B1 | 12/2002 | Chen et al. | |
| 2003/0018825 A1* | 1/2003 | Johnson et al. | 709/310 |
| 2003/0066063 A1 | 4/2003 | Yokota | |
| 2003/0212753 A1 | 11/2003 | Lai | |
| 2004/0249785 A1 | 12/2004 | Gauweiler | |
| 2005/0125460 A1 | 6/2005 | Yu et al. | |
| 2006/0004685 A1 | 1/2006 | Pyhalammi et al. | |
| 2006/0274784 A1* | 12/2006 | Hsueh et al. | 370/466 |
| 2007/0078859 A1 | 4/2007 | Arnold | |

OTHER PUBLICATIONS

A.S.Tanenbaum: "Modern Operating Systems" 2001, Prentice-Hall, Inc. US.
EP05110388.5, Communication pursuant to Article 94(3) EPC dated Aug. 7, 2008.
Canadian Patent Application No. 2,565,577, Examiner's Requisition dated Mar. 4, 2008.

* cited by examiner

*Primary Examiner* — David Q Nguyen
(74) *Attorney, Agent, or Firm* — Moffat & Co.

(57) ABSTRACT

A method and apparatus for provisioning a third party mobile device emulator from desktop provisioning software, the method having the steps of: designating a common file space between the third party mobile device emulator and the desktop provisioning software; writing files to the common file space from one of the third party mobile device emulator and the desktop provisioning software; and reading the files from the other of the third party mobile device emulator and the desktop provisioning software.

14 Claims, 5 Drawing Sheets

SYSTEM AND METHOD FOR PROVISIONING A THIRD PARTY MOBILE DEVICE EMULATOR

RELATED APPLICATIONS

The present application is a continuation of U.S. application Ser. No. 11/266,327, filed Nov. 4, 2005, the contents of which are incorporated herein by reference.

FIELD OF THE APPLICATION

The present application relates to mobile device emulators, and in particular, relates to third party mobile device emulators on which client software is running.

BACKGROUND

As mobile devices and mobile data devices become more complex, one option being introduced by device manufacturers is to include client software on the mobile device. Specifically, the mobile device manufacturer can create the hardware and some software for the mobile device to operate. However, a different software maker can provide specialized software, such as e-mail applications, calendar applications and other data or non-data functionality.

In operation, the mobile device provides a platform for running the client software, which, when integrated with the third party mobile device, provides an enhanced experience for the user.

A mobile communications device, such as a cellular telephone, is typically formed of software, firmware, and hardware adapted to provide communications services over a compatible wireless communications network. This process of forming the relationship between the mobile communications device and the service is known in the art as provisioning. Typically, a network operator provisions the mobile communications device via a subscription to a service contract. Thus, once the mobile communications device has been provisioned, the user of the mobile communications device is often referred to as a subscriber. In a voice and data network such as GSM, GPRS, CDMA, or various other third generation networks such as EDGE or UMTS, both voice and data services may be available to mobile communications devices. Such voice services include voice calling and SMS, and such data services include Internet browsing, email, and MMS.

The data is typically supplied from a personal computer and a connection between the personal computer and the mobile device is established to provision the device. On a third party mobile device, a client is typically provisioned from a desktop using desktop provisioning software. A third party enabler module can be useful when the party that manufactures the mobile device does not create the client software. The module allows communication between the desktop or personal computer and the third party mobile device.

When developing client software, the software maker often requires emulation of the third party mobile device on a personal computer in order to ensure that the software runs correctly before it is implemented on an actual third party mobile device. Third party mobile device manufacturers often create emulators for their products. However, due to the nature of the emulator, the third party manufacturers generally do not provide simulation of communication means such as serial ports, Bluetooth™ connections, IrDA connections or other interfaces typically used for provisioning.

BRIEF DESCRIPTION OF THE DRAWINGS

The present system and method will be better understood with reference to the drawings in which.

DETAILED DESCRIPTION

The present system and method provides a way to provision a third party mobile device emulator without having to significantly re-write the provisioning code, nor requiring modification of the third party emulator.

Specifically, the present application provides for provisioning of an emulator using a file transfer protocol (FTP) transport and a proprietary protocol for communications. Further, a shared directory on the PC is used by both the desktop provisioning software and the emulator in order to ensure effective communication.

The present application therefore provides a method for provisioning a third party mobile device emulator from desktop provisioning software comprising the steps of: designating a common file space between the third party mobile device emulator and the desktop provisioning software; writing files to the common file space from one of the third party mobile device emulator and the desktop provisioning software; and reading the files from the other of the third party mobile device emulator and the desktop provisioning software.

The present application further provides a system for provisioning a third party mobile device emulator comprising: desktop provisioning software; the third party mobile device emulator; and a common file space accessible by both the desktop provisioning software and the third party mobile device emulator, wherein said third party mobile device emulator and said desktop provisioning software are adapted to write files to the common file space and read the files from the common file space written by the other of the third party mobile device emulator and the desktop provisioning software.

Figure 1:
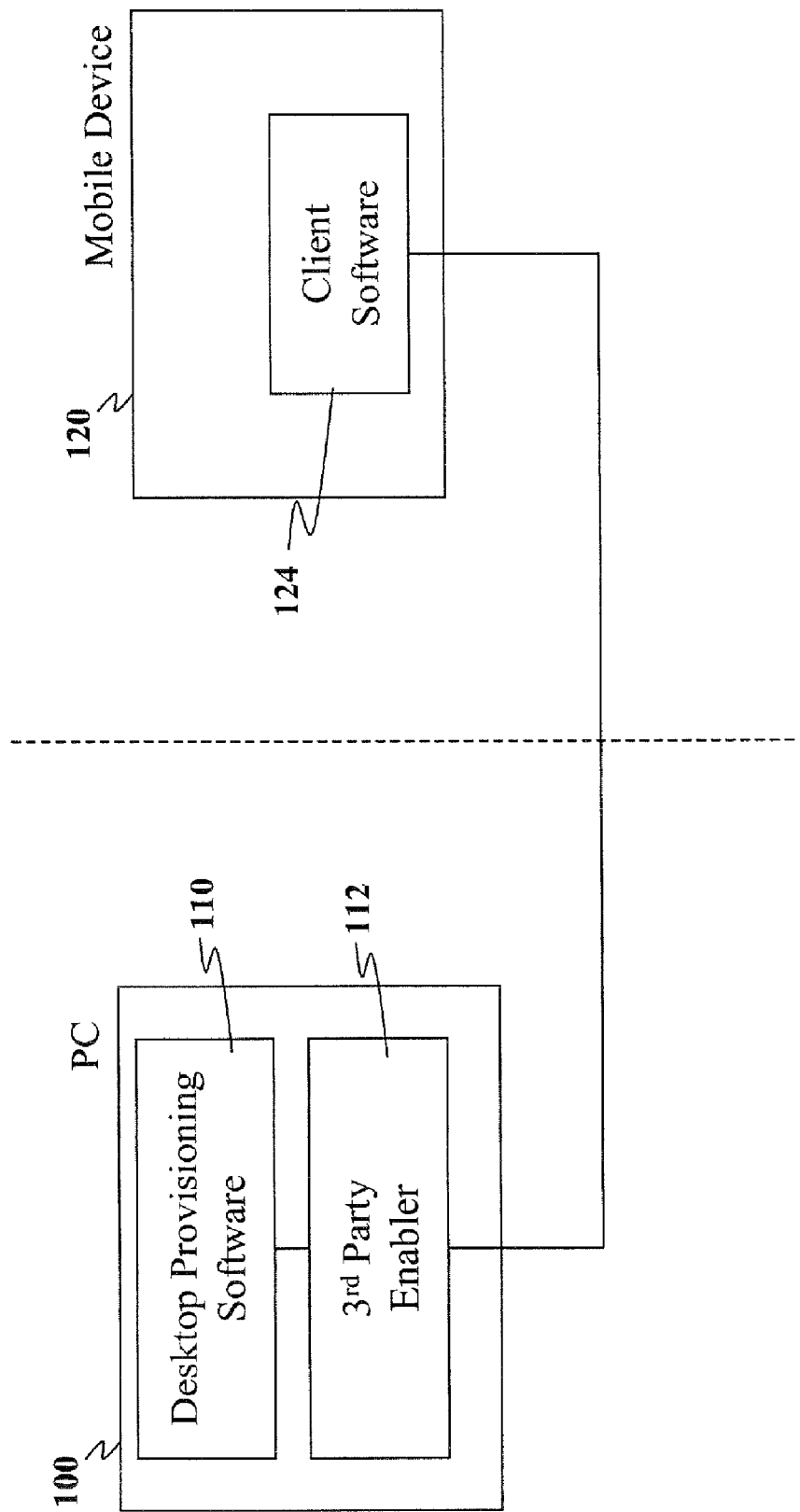
FIG. 1 shows a provisioning diagram from a personal computer to a third party mobile device.

On a mobile data device, provisioning of the data device is required for various reasons. These can include providing software updates, providing private keys for secure e-mail transfer, bulk loading a calendar to match the user's desktop calendar, among others. Typically this is done from a personal computer to the mobile device. When a client is incorporated onto a third party mobile device, the provisioning requires an additional enabler on the personal computer in order to ensure that communications can effectively occur between the mobile device and the personal computer to effectively provision the client software. Reference is now made to FIG. 1.

FIG. 1 shows a personal computer 100 having desktop provisioning software 110 and a third party enabler 112. FIG. 1 also shows a mobile device 120 which is running client software 124.

As will be appreciated by those skilled in the art, mobile device 120 can be manufactured by a different entity than the party that created client software 124.

When a user wishes to provision client software 124 on mobile device 120, a connection is made between mobile device 120 and personal computer 100. Such connections are known in the art, and can include various serial connections such as a USB connection, short range wireless communications such as Bluetooth™ or IrDA, or a radio link communication through a wireless network.

In an exemplary situation, a user wishes to synchronize the calendar on mobile device 120 with a desktop calendar. In this case, desktop provisioning software 110 on personal computer 100 is used to retrieve the calendar information. The calendar information can either reside on personal computer 100 or on a separate computer if personal computer 100 has communication means.

The information is then passed through third party enabler 112, allowing communication with the specific mobile device 120, whereupon it is passed to client software 124 on mobile device 120.

As will be appreciated by those skilled in the art, when developing client software 124, it is convenient, and sometimes necessary to emulate mobile device 120 to create client software 124. This saves the developer from having to upload software changes to mobile device 120 and ensures that the client software 124 is working on an emulator prior to implementation on a physical mobile device 120.

Figure 2:
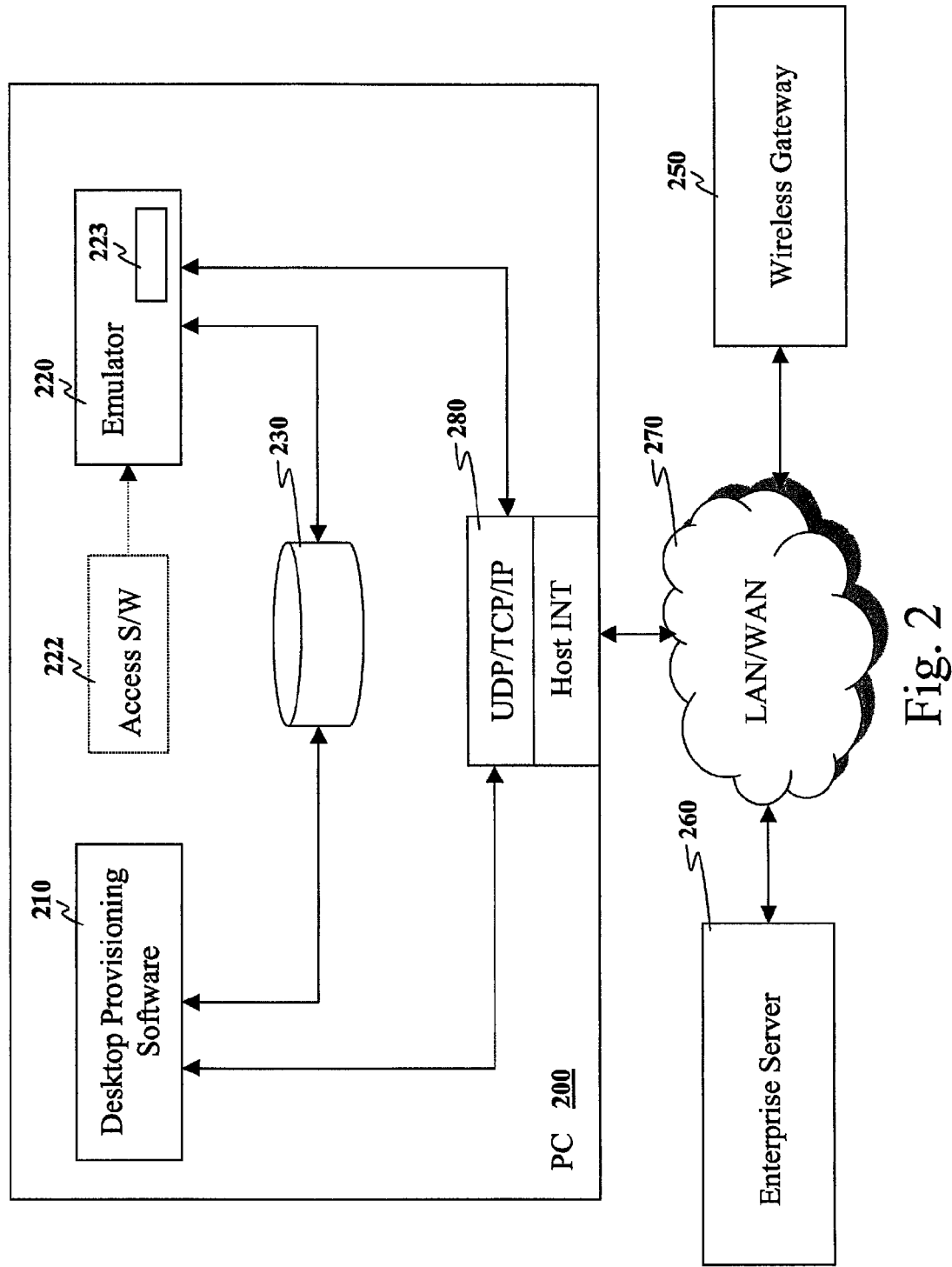
FIG. 2 is a block diagram showing a system according to the present application.

Reference is now made to FIG. 2. FIG. 2 illustrates a personal computer 200, which includes data provisioning software 210 and an emulator 220. As will be appreciated, desktop provisioning software 210 is similar to desktop provisioning software 110 of FIG. 1, and in a preferred embodiment there are very few changes between the two. Further, emulator 220 is an emulator for mobile device 120 as seen in FIG. 1. In practice, the manufacturer of mobile device 120 also creates an emulator 220 in order to test software for the device prior to implementation on a physical device. Development is done on the emulator to provide provisioning, debugging and other functionality, as would be appreciated by those skilled in the art.

When a software manufacturer other than the mobile device manufacturer is creating client software for the mobile device, one problem with current emulators 220 is that they generally do not provide access to standard provisioning for the client software.

Various options to provision the emulator are possible. These could include using a second computer and a connection between the computers, where a port on the computer is used by the emulator as an input and output port. The above would generally use a null modem cable in order to provide access to the emulator. However, this is an undesirable solution since it requires a second computer and is inconvenient for software developers.

A further problem is that the manufacturer of the mobile device emulator 220 may not want to provide a means to "talk" to the emulator. Device manufacturers often have proprietary software that talks to their device's emulator This communication software 222 is typically not useful for third party software makers because the interfaces supplied are not configurable for use by the third party software makers.

In one embodiment of the present application, provisioning is done through a file transfer protocol (FTP) communication in which files are transferred according to a specific communication protocol and data can be provisioned in this way. This is explained in more detail with reference to FIG. 3 below.

Still referring to FIG. 2, one way to bypass connectivity requirements is to provide a common file space for both desktop provisioning software and the emulator to store files. The use of common file space overcomes the communication barriers to the emulator 220 while allowing writing and reading of provisioning information by emulator 220.

Referring to FIG. 2, common file space 230 can be designated via special purpose client software 223 executing on top of emulator 220 as the hard drive space of the simulated mobile device. Further, desktop provisioning software 210 could use the common file space 230 to write provisioning information to. In this way, both the desktop provisioning software 210 and emulator 220 have access to files transferred using the FTP protocol without the communication restrictions found in the prior art. Alternatively, transfer could occur using any communication method, including but not limited to TCP/IP and UDP.

Figure 3:
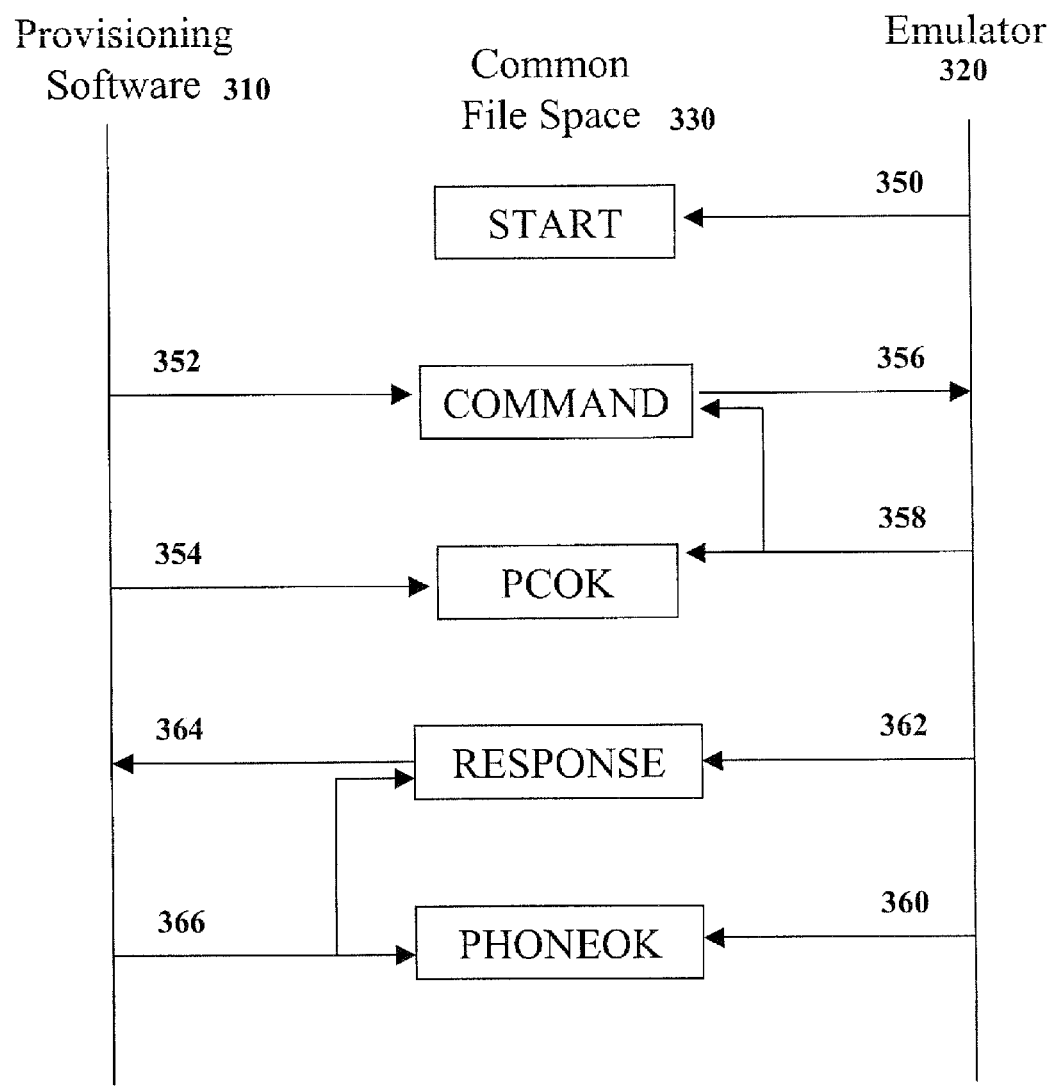
FIG. 3 is a flow diagram showing exemplary provisioning steps according to the present system and method.

The above can be illustrated by the exemplary flow chart of commands as illustrated in FIG. 3. Reference is now made to FIG. 3.

As illustrated in FIG. 3, an emulator 320 that corresponds with emulator 220 of FIG. 2 can write to a common file space 330 that corresponds with common file space 230 of FIG. 2.

Further, desktop provisioning software 310, which corresponds with desktop provisioning software 210 of FIG. 2, can also write to common file space 330.

When emulator 320 is started it transfers a file to the common file space with a particular name. In the example of FIG. 3 this name is 'START'. This is done in step 350.

The provisioning software 310 polls the common file space for files being written to it. Once it sees that the file 'START' was written in step 350 it knows that it can start to provision the emulator 320.

In step 352, the desktop writes a file to the common file space 330 with a specific name. In the example of FIG. 3, the name of the file is 'COMMAND' and the contents of the file include information or instructions. In the case of step 352, the information in the 'COMMAND' file tells the emulator to provide information about itself. In step 354 the provisioning software further writes a file with the title 'PCOK' to common file space 330.

Emulator 320 polls the common file space and when it sees 'PCOK' written it then goes and retrieves the 'COMMAND' file in step 356 and in step 358 deletes the 'COMMAND' file and the 'PCOK' file.

As would be appreciated by those skilled in the art, the 'COMMAND' file can be a large file if it contains significant data, and the reason for providing a 'PCOK' file and a 'COMMAND' file is to ensure the 'COMMAND' file has been fully written before it is retrieved by emulator 320. 'PCOK' is only written after 'COMMAND' file has been completely written onto the common file space 330.

Once emulator 320 has retrieved 'COMMAND' file, the client software 223 reads the contents of the 'COMMAND' file and interprets them. In the present example, client software 223 sees that the provisioning software wants to know more about aspects of emulator 320, and this information is provided in a 'RESPONSE' file in step 360 and a 'PHONEOK' file in step 362.

Provisioning software 310 polls the common file space and when it sees the 'PHONEOK' file it retrieves the 'RESPONSE' file in step 364 and then in step 366 deletes both the 'RESPONSE' file and the 'PHONEOK' file from the common file space.

The provisioning software and the emulator 310 thus communicate in this way back and forth by providing a 'COMMAND' or a 'RESPONSE' file followed by a 'PCOK' or a 'PHONEOK' file in order to facilitate communications between the two applications.

Once the emulator wants to simulate that it has disconnected from provisioning software 310, it can delete the 'START' command in step 368.

Referring again to FIG. 2, one skilled in the art will see that they have use of the common file space, along with the FTP communications described with reference to FIG. 3 provides a means for provisioning the emulator where no communication path existed previously.

As seen in FIG. 2, the desktop provisioning software is able to communicate with an enterprise server 260 to properly provision an emulator 220. Once the emulator 220 is provisioned it can communicate with an enterprise server 260 through a wireless gateway 250, using a local area network or a wide area network such as the Internet 270 using UDP/TCP/IP ports 280 of personal computer 200.

The provisioning process enables the emulator 220 to communicate with wireless gateway infrastructure. This wireless gateway infrastructure can be the same wireless gateway 250 that exists for use by a mobile device. This allows testing of the client software on emulator 220 in a realistic manner, which emulates the communication present in an actual mobile device. Further, enterprise server 260 can store certain information, such as security keys and addressing information, which can be used by desktop provisioning software 210 in order to provision emulator 220.

As will be appreciated by those skilled in the art, peer to peer software does need to be written in order to communicate between the desktop provisioning software 210 and emulator 220, but rather common file space 230 is used with the FTP protocol illustrated in FIG. 3.

Figure 4:
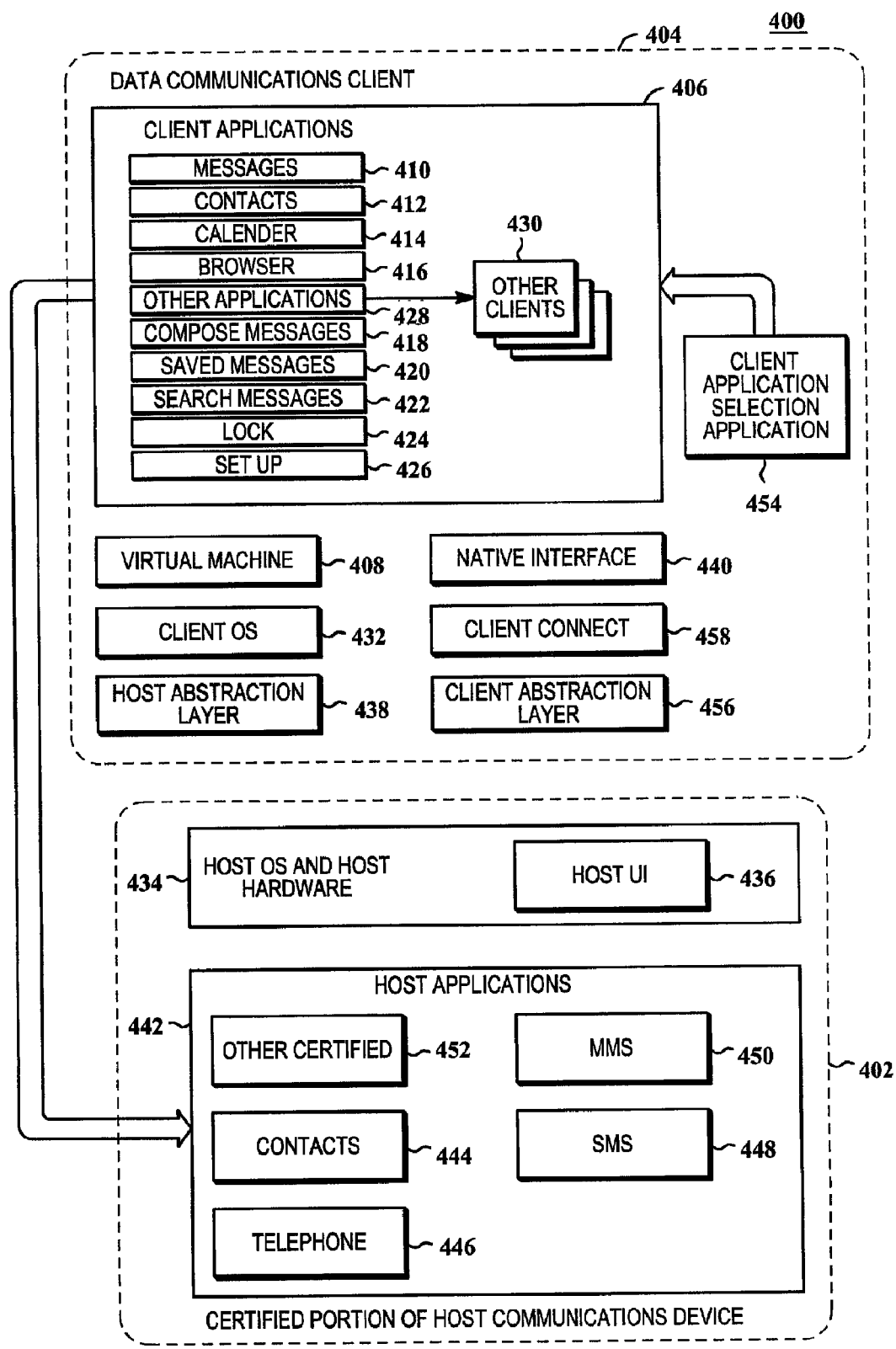
FIG. 4 is a block diagram showing a divided architecture of an exemplary mobile device that can be emulated with the present method and system.

Reference is now made to FIG. 4. FIG. 4 is an exemplary schematic diagram of a mobile device that can be emulation, and in particular the divided architecture between a third party mobile device host and client software. The divided architecture 400 includes client applications 406 running on top of a virtual machine 408. The client applications 406 can be any application that is designed to run on the virtual machine 408 in the data communications client 404, and may include a messages application 410 for viewing messages that have been received, a contacts application 412 to present an address book including phone numbers, e-mail addresses or other contact information for individuals or companies, calendar application 414 for scheduling appointments and managing time, a browser application 416 for browsing the internet or other network, a compose-message application 418 to compose messages for Short Message Service ("SMS") or e-mail, a saved-messages application 420 to view messages that have been saved, a search-messages application 422 to search for a particular message, a lock application 424 to lock the keyboard and screen of the host device, and a set-up application 426 to change the set-up configuration for the data communications client 404. Other applications 428 could also exist as part of client applications 406 and the above-listed applications are not meant to be limiting. Further, other clients besides the data communications client 404 could exist on the certified host communications device 402 and these other clients 430 could have applications which could be invoked from the other applications 428. The virtual machine 408 is preferably started at power-up of the certified host communications device 402 and continues to run as long as the certified host communication device 402 is in operation. The virtual machine 408 may be a Java virtual machine and client applications 406 may be Java applications. All client applications 406 use the virtual machine 408 to invoke instances of objects created by the client applications 406.

A feature call on the divided architecture 400 from the client applications 406 would normally go through a client OS 432. The client OS 432 may include a number of primitives for interacting with host OS and host hardware 434, which includes a host user interface 436. However, in the case that the client applications 406 are built onto the certified host communications device 402 and because the certified host communications device 402 has already acquired certification for its host dependent features such as hardware, software and firmware, it is preferable to have the client OS 432 interact with a host abstraction layer 438 instead of having the client OS 432 directly interacting with the features. The host abstraction layer 438 converts calls from the client applications 406 to host calls through a native interface 440. The native interface 440 invokes host applications 442 in order to use the host dependent features on the certified host communications device 402. The host applications 442 may include a variety of applications such as, but not limited to, a host contacts application 444 including an address book having phone numbers, e-mail addresses or other contact information for individuals or companies, a telephone-related application 446, an SMS application 448, a multi-media message service ("MMS") application 450, and other certified applications 452. These individual host applications are started within the host application 442, and a request from the client application 406 is sent through the client OS 432 to the host abstraction layer 438 where the request is converted with the native interface 440 for the host applications 442.

Because the host applications 442 invoke the features of the certified host communications device 402 rather than the client applications 406 directly utilizing the features, the divided architecture 400 enables the client applications 406 to run in a host environment and use the features of the certified host communications device 402 without having to re-certify. The divided architecture 400 therefore enables the uncertified client, which is the data communications client 404, to be added to the certified host communications device 402 after certification, including an after-market addition to the certified host communications device 402.

One example of a client application using the above described method and system includes the making of a telephone call when the certified host communications device 402 is a cellular telephone. In the host environment, making of the telephone call simply involves using the host applications 442 to create the telephone call where the host applications 442 use certified hardware, firmware and software to connect through a wireless system. However, in the client applications 406, the above described divided architecture 400 requires invoking one of the host applications 442 in order to make the telephone call. The invoked client application could be the address book associated with the contacts application 412, which includes phone numbers for individuals. A user may wish to select a telephone number of a particular individual from the address book associated with the contacts application 412, and to have the cellular telephone, which is the certified host communications device 402 in this example, to make a call to that particular individual. In order to accomplish this task, the user may select the telephone number and select an option to dial that phone number. In this case, the contacts application 412 indicates through the virtual machine 408 to the client OS 432 that it needs to make a telephone call. Instead of using the host dependent feature directly from the client OS 432, a notification is sent to the host abstraction layer 438, which invokes an appropriate application of the host applications 442 through the native interface 440, to make the telephone call. In this example, the invoked host application would be the telephone-related application 446, which starts the telephone call, and the user proceeds as if the telephone call had been started from the client applications 406.

The client applications 406 may also provide the user an option to use the SMS application 448 or the MMS application 450 to contact the individual instead of dialling the telephone number. In each of these cases, a different application of the host applications 442 is invoked, but this task is accomplished similarly through the host abstraction layer 438 and the native interface 440. Alternatively, the messages application 410, which includes a telephone number, may be invoked from the client applications 406.

As one skilled in the art will realize, data is supplied between the client applications 406 and the host applications 442. In the example above, the telephone number would be supplied to the host application 442 including the telephone-related application 446, the SMS application 448, and the MMS application 450.

It is further desirable to be able to activate a selected client application of the client applications 406 from one of the host applications 442. A client application selection application 454 uses a client abstraction layer 456 to activate an application within the client applications 406. The client application selection application 454 calls a function that is translated in the client abstraction layer 456. The client abstraction layer 456 then uses the virtual machine 108 to activate the selected client application of the client applications 406. The client abstraction layer 456 may either inject the client OS 432 event into the virtual machine 408 causing the selected client application of the client applications 406 to become active or, alternatively, may perform a "reverse native call" through the client OS 432 or via a client connect 458 to manipulate the native representation of some client object causing the selected client application of the client application 406 to become active. The client connect 458 can be used for network features for the client applications 406, which enables, for example, the data communications client 404 to communicate using a specific protocol that was not originally supported on the certified host communications device 402. The client connect 458 involves a protocol stack to perform this communication between the data communications client 404 and the certified host communications device 402, and increases and improves client functionality.

Figure 5:
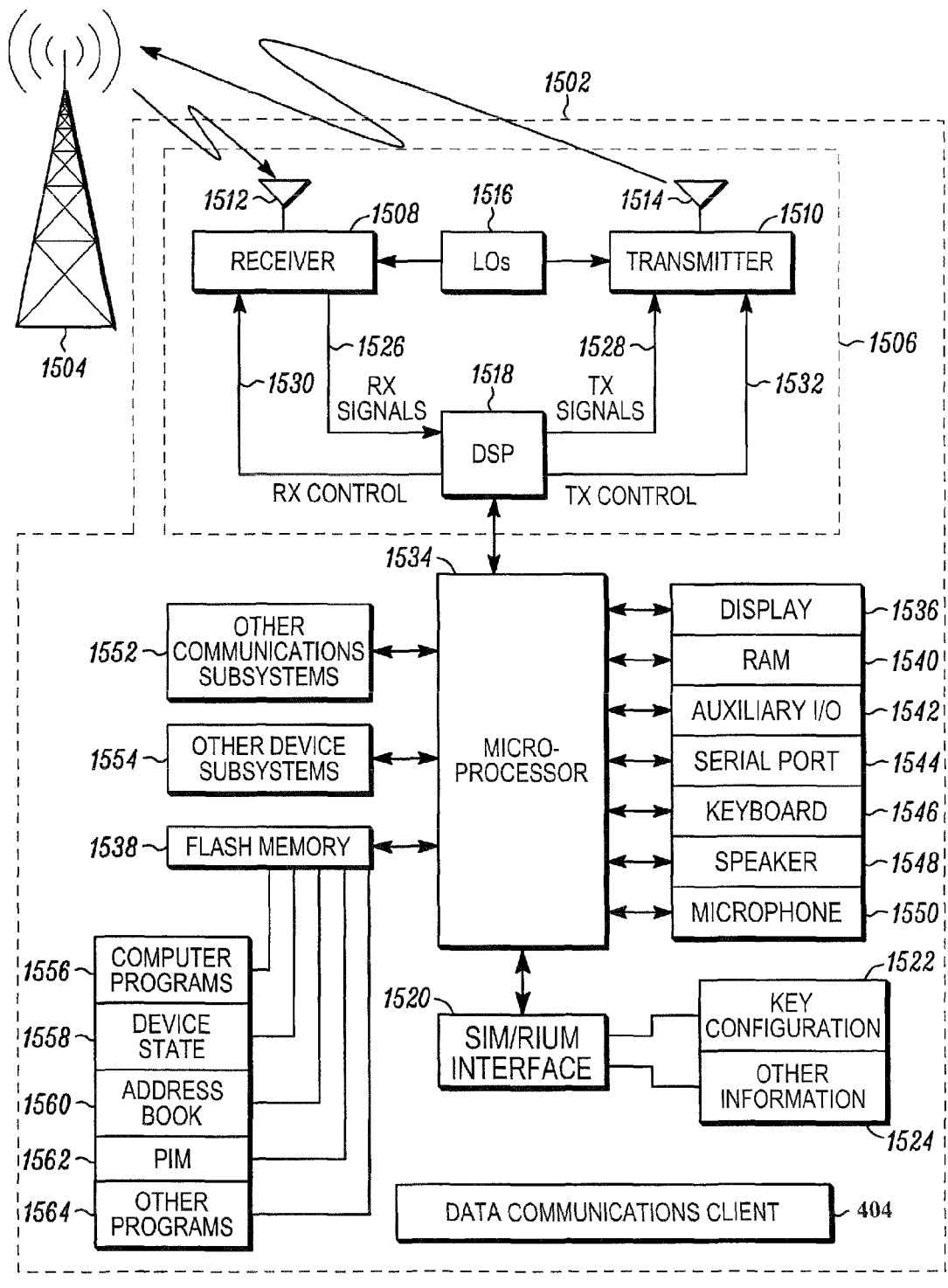
FIG. 5 is a block diagram showing an exemplary mobile device that can be emulated with the present method and system.

FIG. 5 is a block diagram 1500 of an exemplary host mobile station 1502 in wireless communication with a communication network 1504 that the present system and method may emulate. The host mobile station 1502 is preferably a two-way wireless communication device having at least voice and data communication capabilities, and preferably also has the capability to communicate with other computer systems on the Internet. Depending on the exact functionality provided, the host mobile station 1502 may be referred to as a data messaging device, a two-way pager, a wireless e-mail device, a cellular telephone with data messaging capabilities, a wireless Internet appliance, or a data communication device, as examples.

Where the host mobile station 1502 is enabled for two-way communication, it will incorporate a communication subsystem 1506, including both a receiver 1508 and a transmitter 1510, as well as associated components such as one or more, preferably embedded or internal, a receiver antenna 1512 and a transmitter antenna 1514, local oscillators ("LO"s) 1516, and a processing module such as a digital signal processor ("DSP") 1518. As will be apparent to those skilled in the field of communications, the particular design of the communication subsystem 1506 will be dependent upon the communication network in which the device is intended to operate. For example, host mobile station 1502 may include the communication subsystem 1506 designed to operate within the Mobitex™ mobile communication system, the DataTAC™ mobile communication system, General Packet Radio Service ("GPRS") network, Universal Mobile Telecommunications System ("UMTS") network, Enhanced Data for Global System for Mobile Communications ("GSM") Evolution ("EDGE") network or Code Division Multiple Access ("CDMA") network.

Network access requirements will also vary depending upon the type of network 1504. For example, in the Mobitex and DataTAC networks, the host mobile station 1502 is registered on the communication network 1504 using a unique identification number associated with each mobile station. In UMTS and GPRS networks, and in some CDMA networks, however, network access is associated with a subscriber or user of the host mobile station 1502. A GPRS mobile station therefore requires a subscriber identity module ("SIM") card in order to operate on a GPRS network, and a Removable User Identity Module ("RUIM") in order to operate on some CDMA networks. Although the host mobile station 1502 would not fully function without a valid SIM/RUIM card if it is a GPRS/UMTS/CDMA mobile station, local or non-network communication functions, as well as legally required functions (if any) such as "911" emergency calling, may still be available. However, the host mobile station 1502 will be unable to carry out any other functions involving communications over the communication network 1504. A SIM/RUIM interface 1520, which is configured to accept a SIM/RUIM card, is normally similar to a card-slot into which the SIM/RUIM card can be inserted and ejected like a diskette or a Personal Computer Memory Card International Association ("PCMCIA") card. The SIM/RUIM card can have approximately 64K of memory and hold many key configuration 1522, and other information 1524 such as identification, and subscriber related information.

When required network registration or activation procedures have been completed, the host mobile station 1502 may send and receive communication signals over the communication network 1504. Signals received by the receiver antenna 1512 from the communication network 1504 are input to the receiver 1508, which may perform such common receiver functions as signal amplification, frequency down conversion, filtering, channel selection and the like, and in the example system shown in FIG. 5, analog to digital ("A/D") conversion. A/D conversion of a received signal allows more complex communication functions such as demodulation and decoding to be performed in the DSP 1518. In a similar manner, signals to be transmitted are processed, including modulation and encoding for example, by the DSP 1518 and input to the transmitter 1510 for digital to analog ("D/A") conversion, frequency up conversion, filtering, amplification and transmission over the communication network 1504 via the transmit antenna 1514. The DSP 1518, in addition to processing receive and transmit communication signals 1526 and 1528, provides for receiver and transmitter controls 1530 and 1532. For example, the gains applied to communication signals in the receiver 1508 and the transmitter 1510 may be adaptively controlled through automatic gain control algorithms implemented in the DSP 1518.

The communication network 1504 may further communicate with multiple systems (not shown). For example, the communication network 1504 may communicate with both an enterprise system and a web client system in order to accommodate various clients with various service levels.

The host mobile station 1502 preferably includes a microprocessor 1534, which controls the overall operation of the host mobile station 1502. Communication functions, including at least data and voice communications, are performed through the communication subsystem 1506. The microprocessor 1534 also interacts with further device subsystems such as flash memory 1536, a display 1538, random access memory ("RAM") 1540, auxiliary input/output (I/O) subsystems 1542, a serial port 1544, a keyboard 1546, a speaker 1548, a microphone 1550, other communications subsystem 1552, and any other compatible device subsystems, which is generally designated as 1554. Some of the subsystems shown in FIG. 5 perform communication-related functions, whereas other subsystems may provide "resident" or on-device functions. Notably, some subsystems, such as the keyboard 1546 and the display 1538, for example, may be used for both communication-related functions, such as entering a text message for transmission over a communication network, and device-resident functions such as a calculator or task list.

Operating system software used by the microprocessor 1534 is preferably stored in a persistent store such as the flash memory 1538, which may instead be a read-only memory ("ROM") or similar storage element (not shown). Those skilled in the art will appreciate that the operating system, specific device applications, or parts thereof, may be temporarily loaded into a volatile memory such as the RAM 1540. Received communication signals may also be stored in the RAM 1540.

As shown in FIG. 5, the flash memory 1536 can be segregated into different areas for both computer programs 1556 and program data storage such as device state 1558, an address book 1560, personal information manager ("PIM") 1562, and other programs 1564. These different storage types indicate that each program can allocate a portion of the flash memory 1536 for their own data storage requirements. The microprocessor 1534, in addition to its operating system functions, preferably enables execution of software applications on the host mobile station 1502. A predetermined set of applications that control basic operations, including at least data and voice communication applications for example, will normally be installed on the host mobile station 1502 during manufacturing. A preferred software application may be a PIM application having the ability to organize and manage data items relating to the user of the host mobile station 1502 such as, but not limited to, e-mail, calendar events, voice mails, appointments, and task items. Naturally, one or more memory stores would be available on the host mobile station 1502 to facilitate storage of PIM data items. Such PIM application would preferably have the ability to send and receive data items, via the communication network 1504. In a preferred embodiment, the PIM data items are seamlessly integrated, synchronized and updated, via the communication network 1504, with the host mobile station user's corresponding data items stored or associated with a host computer system. Additional applications may also be loaded onto the host mobile station 1502 through the communication network 1504, the auxiliary I/O subsystem 1543, the serial port 1544, other communications subsystem 1552 or any other compatible device subsystem 1554, and be installed by the user in the RAM 1540 or preferably a non-volatile store (not shown) for execution by the microprocessor 1534. Such flexibility in application installation increases the functionality of the host mobile station 1502 and may provide enhanced on-device functions, communication-related functions, or both. For example, secure communication applications may enable electronic commerce functions and other such financial transactions to be performed using the host mobile station 1502.

In a data communication mode, a received signal such as a text message or web page download will be processed by the communication subsystem 1506 and input to the microprocessor 1534, which preferably further processes the received signal for output to the display 1538, or alternatively to the auxiliary I/O subsystems 1542. The user of the host mobile station 1502 may also compose data items such as e-mail messages for example, using the keyboard 1546, which is preferably a complete alphanumeric keyboard or telephone-type keypad, in conjunction with the display 1538 and possibly with the auxiliary I/O subsystems 1542. Such composed items may then be transmitted over the communication network 1504 through the communication subsystem 1506.

For voice communications, overall operation of the host mobile station 1502 is similar, except that the received signals would preferably be output to the speaker 1548 and signals for transmission would be generated by the microphone 1550. Alternative voice or audio I/O subsystems, such as a voice message recording subsystem, may also be implemented on the host mobile station 1502. Although voice or audio signal output is preferably accomplished primarily through the speaker 1548, the display 1538 may also be used to provide an indication of the identity of a calling party, the duration of a voice call, or other voice call related information for example.

The serial port 1544, such as Universal Serial Bus ("USB"), in FIG. 5 would normally be implemented in a personal digital assistant ("PDA")-type host mobile station for which synchronization with a user's desktop computer (not shown) may be desirable, but is an optional device component. The serial port 1544 would enable the user to set preferences through an external device or software application and would extend the capabilities of the host mobile station 1502 by providing for information or software downloads to host mobile station 1502 other than through a wireless communication network. An alternate download path may for example be used to load an encryption key onto the device through a direct and thus reliable and trusted connection to thereby enable secure device communication. Other communications subsystems 1552, such as a short-range communications subsystem, is a further optional component which may provide for communication between the host mobile station 1502 and different systems or devices, which need not necessarily be similar devices. For example, the other communications subsystem 1552 may include an infrared device and associated circuits and components or a Bluetooth™ communication module to provide for communication with similarly enabled systems and devices.

Although many services may be available on a given network, only those subscribers who use mobile communications devices that have been provisioned for those services will be able to benefit from them. This limitation may present problems for both the subscriber and the network operator. On one hand, the subscriber may desire an existing service he does not have, i.e. an upgrade, or desire disabling a service, i.e. a downgrade. On the other hand the operator may want to offer a new service, but may hesitate if subscribers cannot benefit from them. One known solution is to provide an out of band communications link, such as a Universal Serial Bus ("USB"), on the mobile communications device, and enable the subscriber to load new software onto the mobile communications device via the out of band communication link using a personal computer, thus re-provisioning the mobile communications device. This solution may be an unacceptable solution to both the subscriber and the operator as there is a significant risk that the mobile communications device, by error, receives a wrong or incomplete load, and may require servicing. Furthermore, this solution may be unacceptable to the subscriber who does not have access to a personal computer. However, because the host mobile station 1502 is a host communications device that hosts the data communications client 404, the data communications client 404 may be provisioned directly by the user of host mobile station 1502.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for enabling a mobile device emulator to communicate with desktop provisioning software, the mobile device emulator having client software running thereon, the method comprising the steps of:
    designating a common file space from the client software between the mobile device emulator and the desktop provisioning software;
    writing a file to the common file space from the mobile device emulator; and
    monitoring the common file space from the desktop provisioning software for the file written by the mobile device emulator,
    wherein the writing of the file to the common file space indicates that the mobile device emulator is ready to communicate with the desktop provisioning software.

2. The method of claim 1 wherein the monitoring step involves polling the common file space.

3. The method of claim 1 wherein the mobile device emulator is unmodified by any of the steps.

4. The method of claim 1 wherein the common file space is a hard drive space of a computer executing the mobile device emulator.

5. The method of claim 1 wherein the desktop provisioning software and the mobile device emulator communicate with the common file space using a file transfer protocol.

6. The method of claim 1 wherein the mobile device emulator is further configured to signal to the desktop provisioning software via indicator file names.

7. A non-transitory computer readable medium having computer readable instructions stored thereon for execution on one or more processing devices to implement the method of claim 1.

8. A system for enabling communication between a mobile device emulator and desktop provisioning software, the system comprising:
    the desktop provisioning software;
    the mobile device emulator;
    client software running on the mobile device emulator; and
    a common file space between the mobile device emulator and the desktop provisioning software, the common file space having been designated by the client software,
    wherein the mobile device emulator writes a file to the common file space to indicate that it is ready to communicate with the desktop provisioning software, and the desktop provisioning software monitors the common file space for the file written by the mobile device emulator.

9. The system of claim 8 wherein the monitoring of the common file space by the desktop provisioning software is done by way of polling the common file space.

10. The system of claim 8 wherein the mobile device emulator is unmodified.

11. The system of claim 8 wherein the common file space is a hard drive space of a computer executing the mobile device emulator.

12. The system of claim 8 wherein the system is on a personal computer.

13. The system of claim 8 wherein the desktop provisioning software and the mobile device emulator communicate with the common file space using a file transfer protocol.

14. The system of claim 8 wherein the mobile device emulator is further configured to signal to the desktop provisioning software via indicator file names.

* * * * *